(12) United States Patent
Nicheporuck

(10) Patent No.: US 9,004,088 B1
(45) Date of Patent: Apr. 14, 2015

(54) PROTECTIVE CANOPY AND METHOD

(71) Applicant: Eduardo Nicheporuck, Hewitt, NJ (US)

(72) Inventor: Eduardo Nicheporuck, Hewitt, NJ (US)

(*) Notice: Subject to any disclaimer, the term of this patent is extended or adjusted under 35 U.S.C. 154(b) by 0 days.

(21) Appl. No.: 14/036,088

(22) Filed: Sep. 25, 2013

(51) Int. Cl.
*B60J 11/04* (2006.01)
*E04H 15/06* (2006.01)

(52) U.S. Cl.
CPC *B60J 11/04* (2013.01); *E04H 15/06* (2013.01)

(58) Field of Classification Search
CPC .................................. B60J 11/04; E04H 15/06
USPC .......... 135/88.01, 88.05, 88.06, 88.07, 88.08,
135/907; 296/136.01, 136.11, 136.12,
296/136.1, 98, 100.11, 100.15, 100.16;
150/166; 160/370.21, 370.22
See application file for complete search history.

(56) References Cited

U.S. PATENT DOCUMENTS

| | | | | |
|---|---|---|---|---|
| 1,616,126 A | * | 2/1927 | Jacobson | 135/88.05 |
| 2,243,981 A | | 6/1941 | Rowan | |
| 4,480,652 A | * | 11/1984 | Gooch | 135/88.01 |
| 4,795,207 A | | 1/1989 | Clarke | |
| 5,161,849 A | | 11/1992 | Holland, Jr. | |
| 5,791,361 A | * | 8/1998 | Chong | 135/88.01 |
| 5,915,399 A | * | 6/1999 | Yang | 135/88.01 |
| 5,927,793 A | | 7/1999 | McGrath, Jr. | |
| 6,394,528 B2 | * | 5/2002 | Hoenack | 296/136.01 |
| 6,427,709 B1 | * | 8/2002 | Montes | 135/88.07 |
| 6,607,235 B2 | | 8/2003 | McGrath, Jr. | |
| 6,981,509 B2 | * | 1/2006 | Sharapov | 135/88.11 |
| 7,100,965 B1 | | 9/2006 | Stover | |
| 7,159,631 B2 | * | 1/2007 | Yang | 150/166 |
| 7,204,280 B2 | * | 4/2007 | Allen | 150/166 |
| 8,479,787 B1 | * | 7/2013 | Sahadeo et al. | 150/154 |
| 2007/0214684 A1 | | 9/2007 | Guma | |
| 2009/0066112 A1 | * | 3/2009 | Sharapov | 296/136.1 |
| 2009/0102230 A1 | * | 4/2009 | Pehrson | 296/136.13 |
| 2010/0200180 A1 | | 8/2010 | Lien | |
| 2011/0061701 A1 | * | 3/2011 | Perez | 135/96 |
| 2012/0146358 A1 | * | 6/2012 | Sassi et al. | 296/136.12 |

* cited by examiner

*Primary Examiner* — David R Dunn
*Assistant Examiner* — Danielle Jackson
(74) *Attorney, Agent, or Firm* — Thomas J. Germinario

(57) ABSTRACT

A portable canopy can be deployed either on a vehicle or on a paved area. Depending on the amount of tension of its elastic corner straps, the canopy can be deployed in a convex configuration, so as to arch over the cab of a vehicle, or alternatively in a substantially flat configuration, so as to cover a pavement. A series of coil spring strips within the canopy urge it to curl up around its longitudinal axis, so that, when the corner straps are released on one side, that side is lifted by the contraction of the coil strips, thereby expelling accumulated snow/ice to the other side of the vehicle or pavement.

4 Claims, 2 Drawing Sheets

PROTECTIVE CANOPY AND METHOD

FIELD OF THE INVENTION

The present invention relates to the field of covers and/or canopies used to protect and/or shield objects from adverse environmental conditions, such as accumulations of snow or ice. More particularly, the present invention relates to such a cover/canopy which is deployed under tension and repels any accumulated elements, such as snow or ice.

BACKGROUND OF THE INVENTION

Numerous attempts have been made to design covers for vehicles, including cars, boats and even airplanes, and for structures, such as driveways and parking lots, to protect them from the natural elements. Most of such covers have been designed to protect vehicles and/or pavement from snow and ice and to make it easier to clear accumulated snow/ice from the covered objects.

The major problem with such covers is that the weight of the accumulated snow/ice on the cover often makes it extremely difficult to remove the cover from the protected object so as to clear away the snow/ice.

The present invention is a portable canopy, which can be deployed either on a vehicle or on a paved area. Depending on the amount of tension of its elastic corner straps, the canopy can be deployed in a convex configuration, so as to arch over the cab of a vehicle, or alternatively in a substantially flat configuration, so as to cover a pavement. A series of coil spring strips within the canopy urge it to curl up into a cylindrical roll around its longitudinal axis, so that, when the corner straps are released on one side, that side is lifted by the contraction of the coil strips, thereby expelling accumulated snow/ice to the other side of the vehicle or pavement.

SUMMARY OF THE INVENTION

The present invention is a protective canopy for covering objects, such as vehicles or structures, including without limitation motor vehicles, boats, driveways and/or parking lots. The function of the canopy is to intercept snow and/or ice that would otherwise fall and accumulate on the protected object and require great effort to remove by conventional means, such as shovels, brushes or scrapers.

The canopy comprises a flexible, rectangular canopy sheet, which has multiple elastic connectors extending from its corners and/or from its sides as depicted in FIG. 1. Each of the elastic connectors consists of an elastic cord or strap terminating in a coupler, such as a hook, a loop, a magnet or a clamp, that is releasably attachable to the protected object.

Embedded in the canopy sheet are multiple coil spring strips, each of which will curl up into a tight spiral unless a tensioning force is applied to its ends. The coil spring strips are oriented laterally across the canopy sheet, so that they urge the canopy sheet to curl up around a longitudinal axis.

The canopy is unfurled by stretching the elastic connectors and securing their couplers to the protected object. Depending on the amount of tension applied to the elastic connectors, the unfurled canopy sheet can assume a concave (low tension), flat (medium tension) or convex (high tension) configuration. For some applications, such as motor vehicles, the convex configuration, as depicted in FIG. 2, is preferable, because the arched canopy sheet will better tend to shed snow and ice and will be more stable under windy conditions. For other applications, such as driveways, the flat configuration is preferable, since it better conforms to the contours of the covered area and is less apt to be lifted by winds. The configuration of the unfurled canopy can also be adjusted by increasing or decreasing the number of coil spring strips. Optionally, some or all of the coil spring strips can be removable from the canopy sheet.

In order to reinforce the canopy sheet and maintain its rectangular form, semi-rigid stiffening strips can be embedded lengthwise in the sheet, optimally along the two long sides and along the longitudinal centerline of the sheet.

The canopy is deployed by initially attaching the elastic connectors on one side of the canopy sheet to the same side of the protected object, by securing the couplers to projections or recesses on that side of the object, such as the wheel wells of a car. The connectors on the opposite side of the sheet are then pulled and stretched so as to unfurl the canopy over the object, and the couplers are secured to projections/recesses on that side of the object.

After snow and/or ice has accumulated on the canopy, it can be expelled to the side of the object by releasing the couplers on one side of the object, thereby releasing the tension on the coil spring strips and causing that side of the canopy sheet to lift and curl toward the opposite side as the coil spring strips contract. The lifting and curling action of the retracting canopy sheet expels the accumulated snow/ice to the side of the object opposite to where the couplers are released, as illustrated in FIG. 3.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
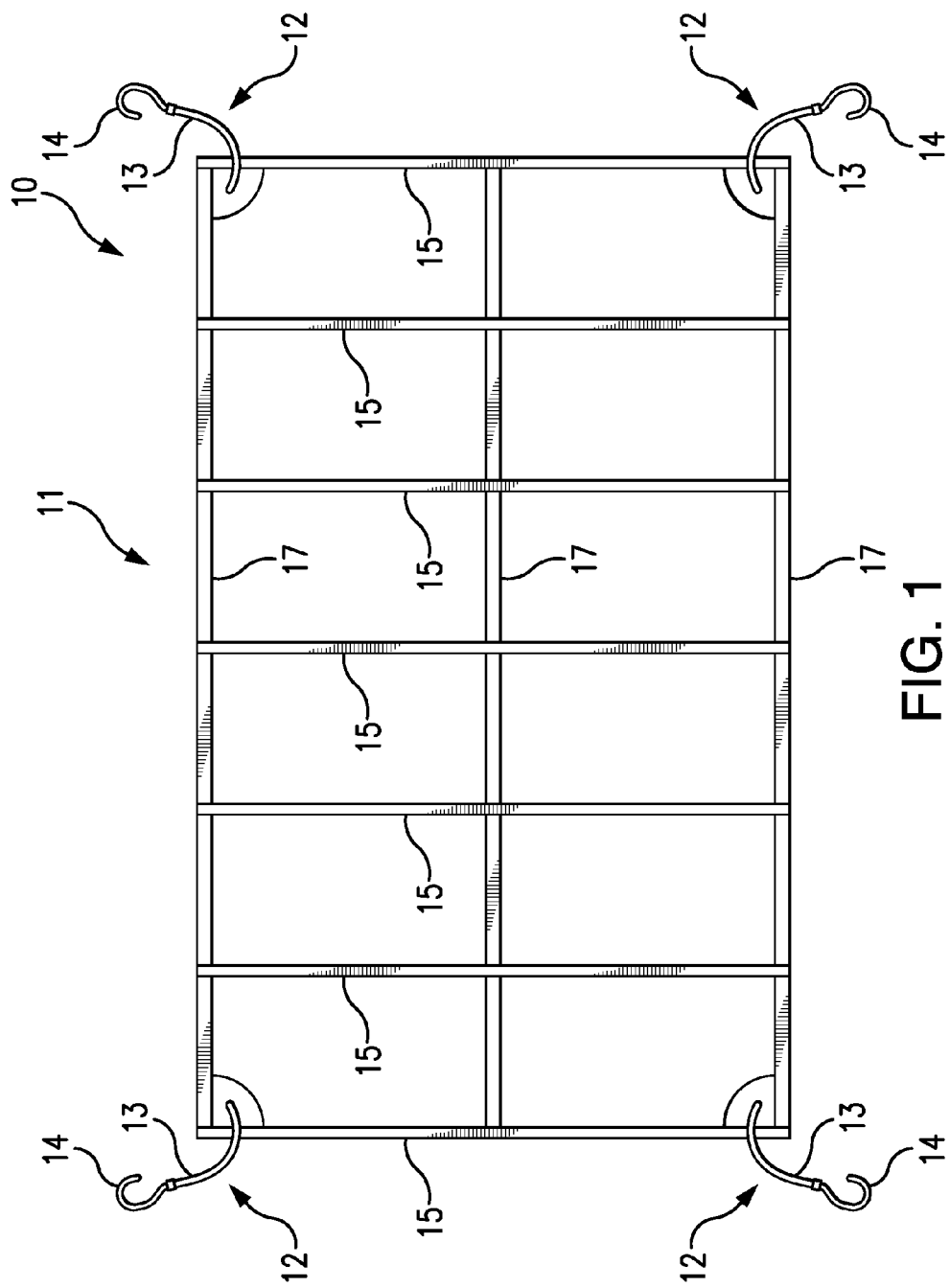
FIG. 1 is plan view of an unfurled protective canopy according to the preferred embodiment of the present invention.

Referring to FIG. 1, the preferred embodiment of the present invention 10 (shown here unfurled) comprises a rectangular canopy sheet 11, made of a flexible, durable, impervious plastic material. The dimensions of the canopy sheet are determined by the shape and size of the object which it is designed to cover. In this exemplary embodiment, the canopy is being used to protect a mid-sized, sedan-type automobile, and would preferably have dimensions of approximately 12 feet by 20 feet.

Extending from the four corners of the canopy sheet 11 are four elastic connectors 12, each comprising a bungee-type elastic cord 13 terminating in a coupler 14—in this example a hook—which is releasably attachable to a projection or recess of the automobile, such as a bumper or a wheel well.

The elastic connectors 12 can be attached to canopy sheet 11 through grommets or embedded in the plastic material.

Multiple coil spring strips 15 are embedded in the canopy sheet 11 and are laterally distributed across the sheet 11. When the canopy sheet 11 is unfurled flat, as shown in FIG. 1, the stretched elastic connectors 12 exert tension on the coil spring strips 15 to keep them extended. When the tension of the stretched elastic connectors 12 is released, the coil spring strips 15 retract into a spiral, thereby causing the canopy sheet 11 to curl up. The coil spring strips 15 are long, narrow, thin rectangular strips of spring steel that retract into a tight spiral when not under tension.

Also embedded in the canopy sheet 11 are multiple semi-rigid stiffening strips, which are long, narrow, thin rectangular strips of a bendable, semi-rigid material, such as plastic or metal. Preferably, the stiffening strips 17 are positioned lengthwise along the sides and centerline of the canopy sheet 11, as shown in FIG. 1.

Figure 2:
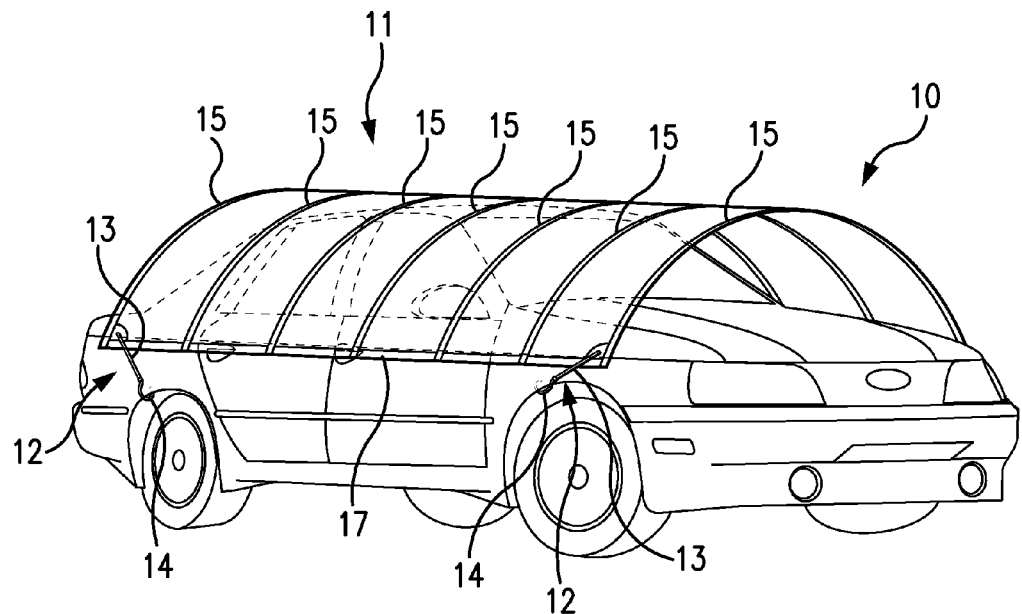
FIG. 2 is a perspective view of the protective canopy deployed to cover an automobile.

As depicted in FIG. 2, the protective canopy 10 can be deployed to cover an automobile by securing the couplers 14 of the four elastic connectors 12 to the wheel wells. In this illustration, the tension of the elastic connectors 12, acting against the retracting force of the coil spring strips 15, is sufficient to bend the canopy sheet 11 into a convex tent-like configuration. This convex configuration has the advantage of protecting the sides and well as the top of the vehicle from snow/ice.

Figure 3:
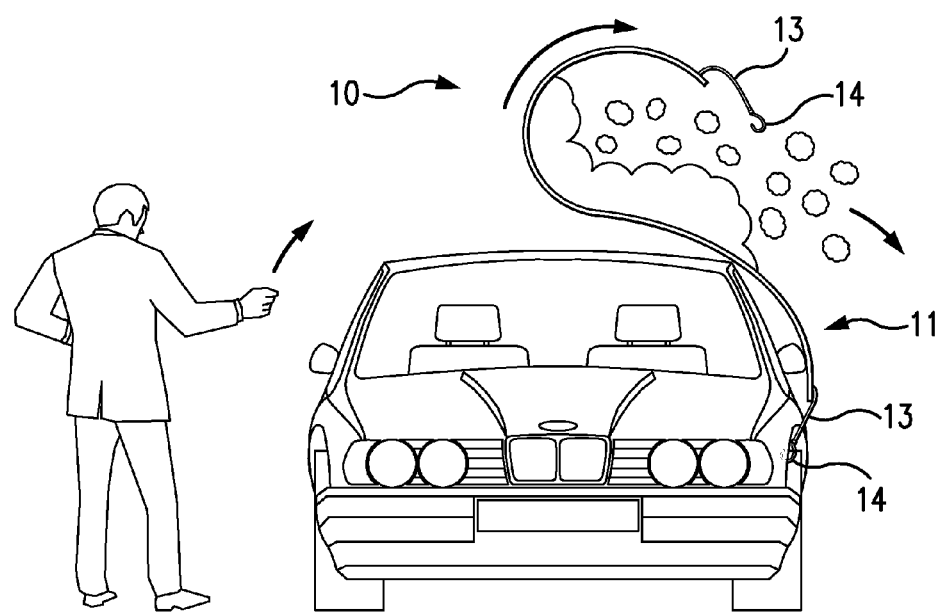
FIG. 3 is a perspective view of the protective canopy in the process of retracting so as to expel accumulated snow from an automobile.

FIG. 3 illustrates the method for clearing snow/ice that has accumulated on the canopy sheet 11. First, the couplers 14 on one side of the vehicle—in this example the passenger side—are released. This releases the tension on the coil spring strips 15 that has been maintaining the convex configuration of the canopy sheet 11. As the coil spring strips 15 retract toward a spiral configuration, they cause the released side of the canopy sheet 11 to lift and curl toward the opposite side of the vehicle—in this case the driver's side. This lifting and curling motion of the canopy sheet 11 lifts the snow/ice accumulated in the sheet 11 and expels it away from the opposite side of the vehicle (here, the driver's side). At this point, any residual snow/ice remaining on the canopy sheet 11 can be shaken off.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A method of using a canopy to protect a protected object from accumulations of snow or ice, the method comprising:
    providing a canopy comprising a flexible, rectangular canopy sheet, having four corners, a longitudinal centerline, and two longitudinal sides, comprising a first longitudinal side and a second longitudinal side;
    providing the canopy further comprising multiple elastic connectors, each comprising an elastic cord or strap having a proximal end embedded in or attached to a corner or to one of the two longitudinal sides of the canopy sheet and having a distal end terminating in a rigid coupler that is releasably attachable to the protected object;
    providing the canopy further comprising one or more coil spring strip(s) embedded in or attached to the canopy sheet and laterally oriented perpendicular to the longitudinal centerline of the canopy sheet, such that the coil spring strip(s) urge(s) the canopy sheet to curl up around a longitudinal axis;
    providing the canopy further comprising one or more semi-rigid stiffening strip(s) embedded in or attached to the canopy sheet and longitudinally oriented parallel to the longitudinal centerline of the canopy sheet;
    securing the couplers of the elastic connectors to the protected object so that the canopy sheet covers all or a portion of the protected object;
    allowing the snow or ice to accumulate on the canopy sheet;
    after the snow or ice has accumulated on the canopy sheet, releasing the couplers, if any, along the first longitudinal side of the canopy sheet and releasing the couplers, if any, at the two corners of the canopy sheet adjacent to the first longitudinal side, so as to allow the coil spring strip(s) to contract, thereby causing the first longitudinal side of the canopy sheet to lift and retract toward the second longitudinal side of the canopy sheet, and thereby expelling accumulated snow or ice away from the protected object; and
    lifting and shaking the canopy sheet to expel residual snow or ice remaining on the canopy sheet.

2. The method of claim 1, wherein the stiffening strips are located along the two longitudinal sides and along the longitudinal centerline of the canopy sheet.

3. The method of claim 1, wherein some or all of the coil spring strips are removably attached to the canopy sheet.

4. The method of claim 3, comprising the additional step, prior to securing the couplers of the elastic connectors to the protected object, of removing one or more of the coil spring strips from the canopy sheet so as to adjust the configuration of the canopy sheet.

* * * * *